US012344018B2

(12) United States Patent
Wind et al.

(10) Patent No.: US 12,344,018 B2
(45) Date of Patent: Jul. 1, 2025

(54) REGISTRATION OF DUPLEX PRINTED SHEETS IN A SHEET STACKING DEVICE

(71) Applicant: Canon Production Printing Holding B.V., Venlo (NL)

(72) Inventors: Anne A. Wind, Venlo (NL); Ronnie E. A. Blom, Venlo (NL); Christopher J. Borchert, Venlo (NL); Müge Artar, Venlo (NL)

(73) Assignee: CANON PRODUCTION PRINTING HOLDING B.V., Venlo (NL)

(*) Notice: Subject to any disclaimer, the term of this patent is extended or adjusted under 35 U.S.C. 154(b) by 0 days.

(21) Appl. No.: 18/518,825

(22) Filed: Nov. 24, 2023

(65) Prior Publication Data

US 2024/0181790 A1 Jun. 6, 2024

(30) Foreign Application Priority Data

Dec. 5, 2022 (EP) .................................... 22211355

(51) Int. Cl.
*B41J 3/60* (2006.01)
*B41J 11/00* (2006.01)

(52) U.S. Cl.
CPC ............ *B41J 3/60* (2013.01); *B41J 11/0095* (2013.01)

(58) Field of Classification Search
CPC ................................ B41J 3/60; B41J 11/0095
See application file for complete search history.

(56) References Cited

U.S. PATENT DOCUMENTS 5,322,273 A * 6/1994 Rapkin .................. B65H 9/002 271/227
5,957,598 A 9/1999 Berkers et al.
9,457,980 B2 10/2016 Kuypers et al.
2004/0251611 A1* 12/2004 Rapkin .................... B65H 9/20 271/226
2005/0185976 A1* 8/2005 Morimoto ........ G03G 15/04045 399/50

FOREIGN PATENT DOCUMENTS

EP 3 398 785 B1 2/2020
JP 2005-263463 A 9/2005
JP 2014-128903 A 7/2014
JP 2019-85215 A 6/2019
JP 2020-33138 A 3/2020

OTHER PUBLICATIONS

European Search Report, issued in Application No. 22 21 1355, dated May 17, 2023.

* cited by examiner

*Primary Examiner* — David H Banh
(74) *Attorney, Agent, or Firm* — Birch, Stewart, Kolasch & Birch, LLP

(57) ABSTRACT

A method of printing and stacking sheets improves the relative alignment of images in a stack of printed sheet. The method includes feeding a sheet at least twice past a print-head assembly for printing an image on both sides of the sheet, wherein in the first and second passes the respective front and back images are aligned with respect to a first edge of the sheet by detecting a skew angle between the first and second edges and applying the skew angle to align the front and back images; and stacking the sheet, wherein the sheet is registered to a predetermined stacking reference direction by one of its edges, and wherein during the stacking, the sheet is registered by its first edge.

12 Claims, 5 Drawing Sheets

REGISTRATION OF DUPLEX PRINTED SHEETS IN A SHEET STACKING DEVICE

BACKGROUND OF THE INVENTION

1. Field of the Invention

The invention relates to a method of printing and stacking sheets, duplex printer, a computer program, and a computer readable medium.

2. Description of Background Art

EP 3398785 B1 describes a method of duplex printing, comprising the steps of:

a) feeding a media sheet past a printhead assembly in a first pass and printing a front side image on a front side of the sheet;

b) measuring a skew angle of a first edge of the sheet relative to a reference direction, the first edge being a trailing edge of the sheet in the first pass;

c) flipping the sheet and feeding it to the printhead assembly with the first edge as the leading edge;

d) calculating and performing a rotation of the sheet relative to a back side image to be printed on the back side of the sheet, the rotation being required for registering the back side image with the front side image; and e) printing the back side image in a second pass, wherein step a) comprises printing on the sheet at least two marks which define a reference direction of the front side image, and said reference direction is used as the reference direction in step b).

In a print process it is generally desired that a leading edge of the printed front side image, which edge defines a reference direction of the image, is aligned with the leading edge of the sheet. If the sheet is fed in a skewed position, it is common practice to rotate the sheet so as to align the leading edge of the sheet with the reference direction of the image. Since the leading edge of the sheet and the leading edge of the image are normally separated by a certain margin, a slight misalignment of the two edges is hardly perceptible with the naked eye. Consequently, the skew angle correction needs to be performed only with a limited accuracy.

In duplex printing, however, a "shadow" of the back side image is in many cases visible from the front side of the sheet because the sheet has a certain translucency.

Consequently, the positions of the edges of the back side image can be compared directly with the positions of the corresponding edges of the front side image, and even minor misalignments become visible and are found disturbing. Even when the sheet is totally opaque, a misalignment of the front side and back side images may be found disturbing, for example, when a multi-page duplex document is bound into a booklet, so that a front side image and a back side image are visible simultaneously. Likewise, when a multi-page duplex document is scanned-in and the scanned document is scrolled on a computer screen, the differences between the reference directions of the front side images and back side images become perceptible.

If the leading edge and the trailing edge of the sheet are not exactly parallel to one another, and if the skew angle of the leading edge is corrected before printing the front side image in the first pass, and, in the second pass, the skew angle of the leading edge, which has formerly been the trailing edge, is corrected by rotating the sheet, then the front side image and the back side image will be rotated relative to one another by a relatively large angle which is twice the angle between the leading and trailing edges of the sheet.

Thus, the angle of the first edge of the sheet, which becomes the leading edge in the second pass, is related directly to the reference direction of the image that has been printed in the first pass. This permits to calculate a rotation which precisely corrects the skew angle difference between the front side and the back side image, and when, in the second pass, the angle of the sheet (or the image) is adjusted to the angle that has been calculated in this way, a perfect registry of the front side and back side images will be obtained.

By comparison, if the direction of the second edge of the sheet, which is the leading edge in the first pass, would be taken as the reference direction, then the accuracy of the correction would be inferior, because it cannot always be taken for granted that the front side image is really aligned with the second edge (leading edge in the first part) of the sheet which sufficient accuracy.

This also permits to eliminate all mounting tolerances that may affect the alignment of the printhead assembly (and hence the reference direction of the printed images) with the detection system that is used for measuring the skew angles.

The duplex printed sheets are generally further stacked by sheet stacking device, which registers the received sheets by one of their edges to a predetermined angle. It was found that in the completed stack, the images of different sheets were not aligned with respect to one another. Since the stack is usually aligned with respect to processing equipment for cutting, book binding, etc. by the registered edges, the images in the final print product may become misaligned with respect to one another.

SUMMARY OF THE INVENTION

It is an object of the invention to provide an improved method of duplex printing and stacking that improves the alignment of the images on different sheets in the stack.

In accordance with the present invention, a method of printing and stacking sheets according to claim 1, a duplex printer according to claim 9, and a computer program according to claim 10 are provided.

The method comprises the steps of:

feeding a sheet at least twice past a printhead assembly for printing an image on both sides of the sheet, wherein in the first and second passes the respective front and back images are aligned with respect to a first edge of the sheet by detecting a skew angle between the first and second edges and applying the skew angle to align the front and back images with respect to one another;

stacking the sheet wherein the sheet is registered to a predetermined stacking reference direction by one of its edges.

The method is characterized in that during the step of stacking the sheet is registered by its first edge.

It is the insight of the inventor that by registering the sheets in the stack to the same edge of the sheet as the edge that was used for aligning the front and back images on the sheet, all images in the stack will be aligned with respect to one another. The front and back images are aligned (i.e. positioned at the same angle) with respect to the same, first edge of the sheet, wherein the skew angle is applied to correct for non-parallelism of the leading and trailing edge. The same, first edge is also applied in the sheet stacking device to register the sheet. The first edge is preferably opposite the second edge of the sheet. All the images on all sheets in the stack are aligned in the same angle and thus with respect to one another. Thereby, the object of the present invention has been achieved.

More specific optional features of the invention are indicated in the dependent claims.

In an embodiment, the first edge is the trailing edge on the first pass and the leading edge on the second pass, and the sheet is registered during stacking on the first edge being the leading edge as the sheet moves towards a sheet stacking device. In another embodiment, the first edge is the leading edge on the first pass and the trailing edge on the second pass, and the sheet is flipped after printing the back image, so that the sheet is registered during stacking on the first edge being the leading edge as the sheet moves towards a sheet stacking device. When aligning the front image with respect to the trailing edge on the first pass, the first edge becomes the leading edge on the second pass, and thereby also the edge which is used to register the sheet during stacking. The same result may also be achieved when aligning the front image with respect to the leading edge on the first pass and flipping the sheet for a second time after printing the back image, so that the first edge is again the leading edge.

In an embodiment, the method further comprises the step of detecting a first angle of the first edge and a second angle of a second edge with respect to a reference direction. Preferably, the first angle of the first edge is detected with respect to the reference direction as well as the second angle of the second edge. By comparison and/or subtraction of the first and second angles, the skew angle between the first and second edges can be determined. The detection may be performed by a detection system configured to detect the passage of two spaced apart points on an edge of the sheet. The reference direction is preferably defined with respect to the printhead assembly to facilitate easy alignment of the sheets with the images. The reference direction is the same for both passes of the sheet, but does not need not be parallel to the stacking reference direction.

In an embodiment, the step of detecting the first and second angles is performed before the sheet arriving at the printhead assembly on its first pass. The skew angle between the first and second edges has been detected and/or determined upstream of the printhead assembly. This allow the sheet to be rotated so that the first edge is aligned with and thus preferably parallel to the reference direction before printing on the sheet. Thereby, the first edge is aligned with and preferably parallel to the direction of the printhead assembly, so that the first image is printed perpendicular to the first edge.

In an embodiment, the method further comprises the step of flipping the sheet, such that the first and second edges each take the relative position of the other. The sheet is flipped around an axis perpendicular to its transport direction and/or substantially parallel to the reference direction. The sheet is preferably flipped after printing on the first side of the sheet on the first pass and before returning the sheet to the printhead assembly.

In an embodiment, on the first pass the first image is aligned with respect to a trailing edge. On the first pass, the first edge is the trailing edge and the first image is aligned with respect to the trailing edge by rotating the trailing edge into alignment with the reference direction, preferably parallel to the reference direction. Preferably, the sheet is re-orientated, such that the first image is printed perpendicular to the trailing edge. On the second pass, the sheet is flipped so that the first edge becomes the leading edge, making it easy to utilize the first edge in registering the sheet during stacking. It will be appreciated that it is common for a skew angle correction system to control the rotation of the sheet based on detection of its leading edge. The skew angle is applied to ensure that the trailing edge is aligned to the reference direction even when the rotation is controlled based on the leading edge. The leading edge may for example be controlled to be skewed at angle with respect to the reference direction, so that the trailing edge is parallel to it.

In an embodiment, on the second pass the second image is aligned with respect to a leading edge of the sheet, which respective edge was a trailing edge of the sheet on the first pass. On the second pass, the first edge has become the leading edge due to the flipping of the sheet. The first image has been aligned with respect to the first edge and in the second pass the sheet is rotated, such that the leading edge is aligned with the reference direction. The second image is thereby printed in parallel alignment to the first image, preferably perpendicular to the leading edge. After duplex printing, the sheet continues towards the sheet stacking device with the first edge as it leading edge, so that the first edge comes into contact with the registration element. In another embodiment, the sheet is registered during stacking to its leading edge after its second pass. All sheets in a stack are printed and registered in this manner. As both front and back images have been aligned to the first edge, all images in the stack are in parallel alignment with one another.

The present invention further relates to a duplex printer comprising a print surface, a printhead assembly facing the print surface, a sheet conveying system arranged to feed media sheets over the print surface and past the printhead assembly, the sheet conveying system including a duplex loop; a skew angle correction system arranged to rotate the sheets relative to images to be printed thereon, a detection system arranged to detect an edge of the sheet; and an electronic controller receiving signals from the detection system and controlling the printhead assembly, the sheet conveying system and the skew angle correction system, wherein the controller is configured to perform the above described method.

The invention further relates to a computer program comprising instructions to cause the printer to execute the steps of the above described method and to a computer-readable medium having stored thereon the computer program.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
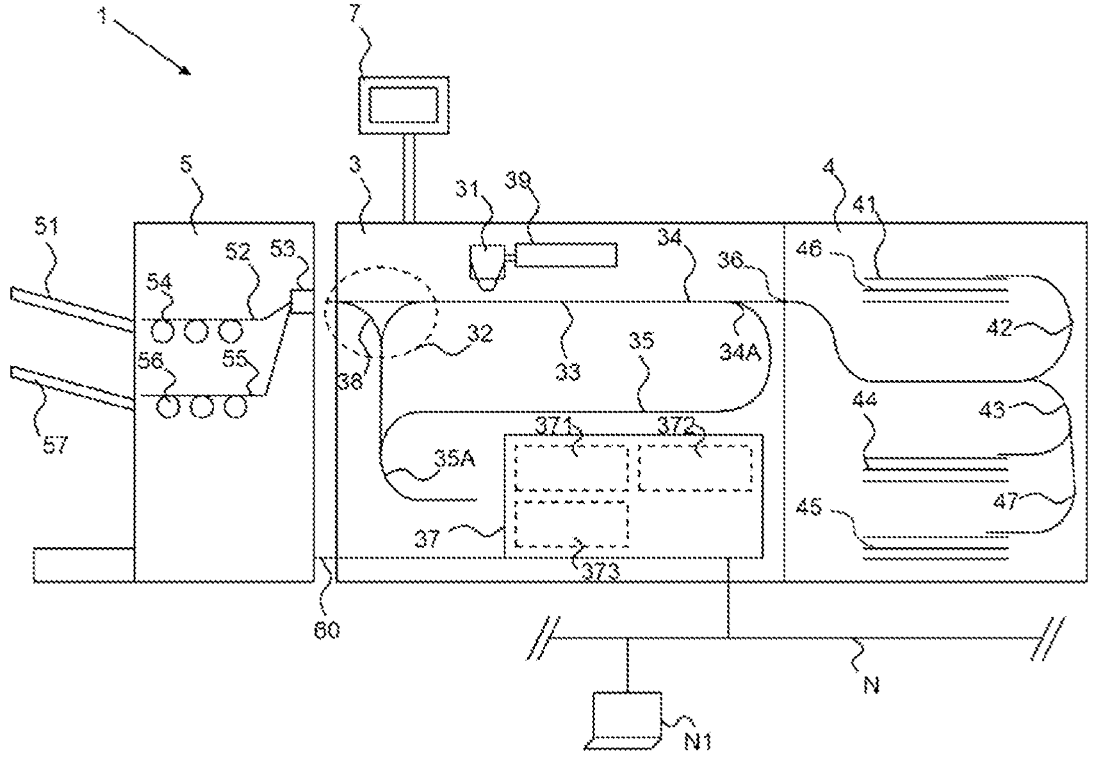
FIG. 1 is a schematic side view of a duplex sheet printer.

The present invention will now be described with reference to the accompanying drawings, wherein the same reference numerals have been used to identify the same or similar elements throughout the several views.

Printer

FIG. 1 shows schematically an embodiment of a printing system 1 according to the present invention. The printing system 1, for purposes of explanation, is divided into an output section 5, a print engine and control section 3, a local user interface 7 and an input section 4. While a specific printing system is shown and described, the disclosed embodiments may be used with other types of printing system such as an ink jet print system, an electrographic print system, etc.

The output section 5 comprises a first output holder 52 for holding printed image receiving material, for example a plurality of sheets. The output section 5 may comprise a second output holder 55. While 2 output holders are illustrated in FIG. 1, the number of output holders may include one, two, three or more output holders. The printed image receiving material is transported from the print engine and control section 3 via an inlet 53 to the output section 5. When a stack ejection command is invoked by the controller 37 for the first output holder 52, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57. Preferably the output section 5 comprises a sheet stacking device for one or more output holders 52, 55. Sheet stacking devices are known from e.g. U.S. Pat. No. 9,457,980 B2. The sheet stacking device preferably comprises a registration element against which the leading of the sheets are pressed, such that these leading edges become aligned in the same stacking reference direction. This ensures that the edges of the different sheets 41 are aligned with respect to one another at the output holders 52, 55. This results in a neatly stacked pile of sheets and the aligned edges are preferably applied in the further processing of sheets, such as cutting or binding for aligning the processing equipment to the sheets.

The print engine and control section 3 comprises a print engine and a controller 37 for controlling the printing process and scheduling the plurality of sheets in a printing order before they are separated from input holder 44, 45, 46. The controller 37 is a computer, a server or a workstation, connected to the print engine and connected to the digital environment of the printing system, for example a network N for transmitting a submitted print job to the printing system 1. In FIG. 1 the controller 37 is positioned inside the print engine and control section 3, but the controller 37 may also be at least partially positioned outside the print engine and control section 3 in connection with the network N in a workstation N1. The controller 37 comprises a print job receiving section 371 permitting a user to submit a print job to the printing system 1, the print job comprising image data to be printed and a plurality of print job settings. The controller 37 comprises a print job queue section 372 comprising a print job queue for print jobs submitted to the printing system 1 and scheduled to be printed. The controller 37 comprises a sheet scheduling section 373 for determining for each of the plurality of sheets of the print jobs in the print job queue an entrance time in the paper path of the print engine and control section 3, especially an entrance time for the first pass and an entrance time for the second pass in the loop in the paper path according to the present invention.

Resources may be recording material located in the input section 4, marking material located in a reservoir 39 near or in the printhead or printhead assembly 31 of the print engine, or finishing material located near the printhead or printhead assembly 31 of the print engine or located in the output section 5 (not shown).

The paper path comprises a plurality of paper path sections 32, 33, 34, 35 for transporting the image receiving material from an entry point 36 of the print engine and control section 3 along the printhead or printhead assembly 31 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The printhead or printhead assembly 31 is suitable for ejecting and/or fixing marking material to image receiving material. The printhead or printhead assembly 31 is positioned near the paper path section 34 which comprises the print surface opposite the printhead assembly 31. The printhead assembly 31 may comprise a page-wide array of inkjet printheads. Upstream of the printhead assembly 31 is preferably a skew angle correction system, as known for example from U.S. Pat. No. 5,957,598 A. The skew angle correction system comprises a detection system to detect the angle of the sheet and a correction mechanism to re-orient the sheet into alignment with the printhead assembly 31.

While an image receiving material is transported along the paper path section 34 in a first pass in the loop, the image receiving material receives the marking material through the printhead or printhead assembly 31. A next paper path section 32 is a flipping unit 32 for selecting a different subsequent paper path for simplex or duplex printing of the image receiving material. The flipping unit 32 may be also used to flip a sheet of image receiving material after printing in simplex mode before the sheet leaves the print engine and control section 3 via a curved section 38 of the flipping unit 32 and via the inlet 53 to the output section 5. The curved section 38 of the flipping unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the duplex loop of paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the printhead or printhead assembly 31 in the loop. The sheets coming from the paper path section 35 are starting their second pass along the printhead or printhead assembly 31 in the loop. When a sheet has passed the printhead or printhead assembly 31 for the second time in the second pass, the sheet is transported to the inlet 53 of the output section 5.

The input section 4 may comprise at least one input holder 44, 45, 46 for holding the image receiving material before transporting the sheets of image receiving material to the print engine and control section 3. Sheets of image receiving material are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of image receiving material, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printing system 1.

Stacking of Duplex Printed Sheets

Figure 2:
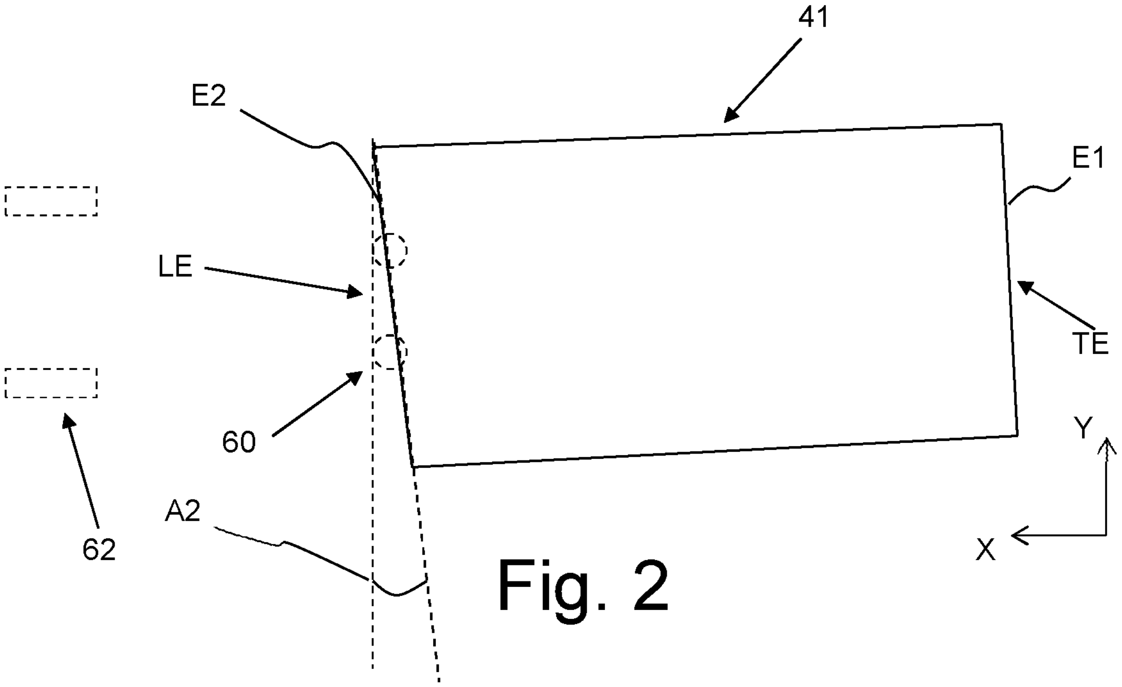
FIG. 2 is a schematic top view of a sheet in the step of detecting the angle of the leading edge on the first pass.

FIG. 2 illustrates a sheet 41 as it is being transported towards the printhead assembly 31 on its first pass along the printhead assembly 31. The sheet 41 has non-parallel leading and trailing edges LE, TE. In the example in FIG. 2 the lateral edges of the sheet 41 are also non-parallel. Non-parallel herein being defined as oriented with respected to one another at a non-zero angle, preferably within the same plane, being the plane defined by the sheet 41. The first edge E1 of the sheet 41 in FIG. 2 forms the trailing edge, while the second edge E2 forms the leading edge LE. The leading and trailing edges LE, TE are defined with respect to the transport direction X, while the first and second edges E1, E2 are defined with respect to the sheet 41 itself.

In FIG. 2 the sheet 41 is being transported to the printhead assembly 31, but first moves towards the skew angle correction system 62, which is positioned upstream of the printhead assembly 31. The skew angle correction system 62 is provided with a detection system 60 for detecting the angle of the sheet 41 with respect to a predetermined direction, in this example the reference direction Y. The reference direction Y is preferably parallel to an angle of the printhead assembly 31. The detection system 60 in FIG. 2 measures the angle of the leading edge LE of the sheet 41, for example by determining the moment of passage of two spaced apart points on the leading edge LE and comparing it to the velocity of the sheet 41. Thereby, the angle of the sheet 41 with respect to the reference direction Y can be determined. In FIG. 2, the leading edge LE is skewed with respect to the reference direction Y by the second angle A2.

The skew angle correction system 62 further comprises sheet rotation means to adjust the angle and/or position of the sheet 41. In FIG. 2, the sheet rotation means comprise a pair of drive rollers, which can be driven at different speeds and/or oriented at different angles with respect to one another, thereby causing a controlled rotation and/or shifting of the sheet 41.

Figure 3:
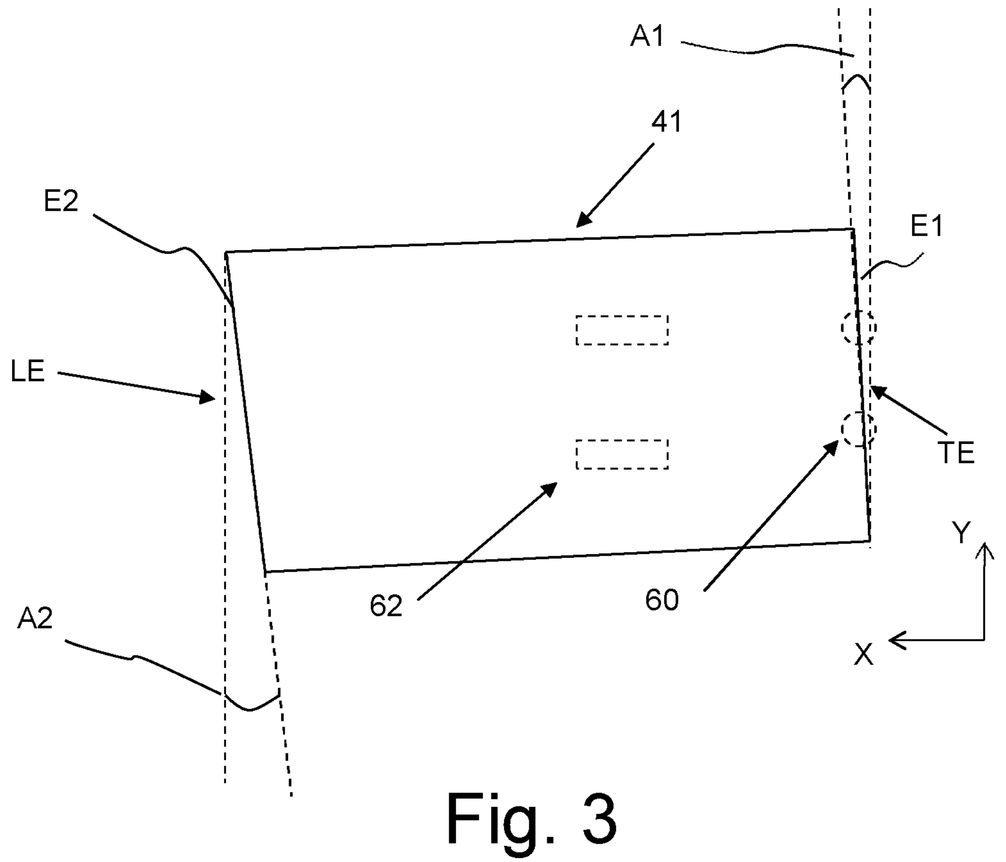
FIG. 3 is a schematic top view of the sheet in the step of detecting the skew angle between the leading and trailing edges.

In FIG. 3, the sheet 41 moves further across the sheet registration device 62. The trailing edge TE reaches the detection system 60, such that its angle can be determined. In FIG. 3, it is determined that the trailing edge TE is at a first angle A1 with respect to the reference direction Y. Between the measurements of the leading and trailing edge LE, TE the angle of the sheet remained constant, so that from the first and second angles A1, A2 the skew angle A3 of the leading edge LE with respect to the trailing edge TE can be determined via:

$$A3=A2-A1$$

The skew angle A3 corresponds to the angle between the first and second edges E1, E2 of the sheet 41. In case the skew angle A3 is non-zero, the first and second edges E1, E2 of the sheet 41 are not parallel to one another.

Figure 4:
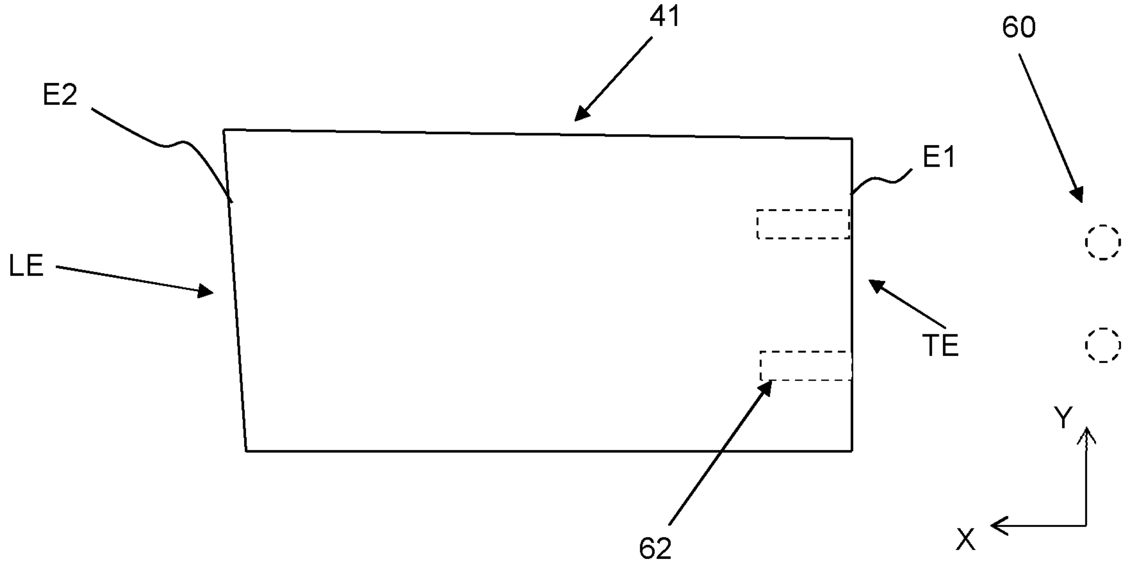
FIG. 4 is a schematic top view of the sheet in the step of rotating the sheet so that the first edge is aligned with reference direction.

FIG. 4 illustrates the re-orientation of the sheet 41. The skew angle correction system 62 is controlled by the controller 37 based on the determined angle of the first edge E1 to rotate the sheet 41, so that the first edge 41 is brought parallel to the reference direction Y. Thereto, the sheet 41 is rotated by an angle equal to the first angle A1. The rotation is often controlled based on the leading edge E1, so the controller 37 drives the skew angle correction system 62, so that the leading edge LE is at angle with the reference direction Y equal to the skew angle A3. Thereby, the trailing edge TE is brought parallel to the reference direction Y. The detection and rotation are preferably performed while the sheet 41 is in constant movement in the transport direction X, which is perpendicular to the reference direction Y.

Figure 5:
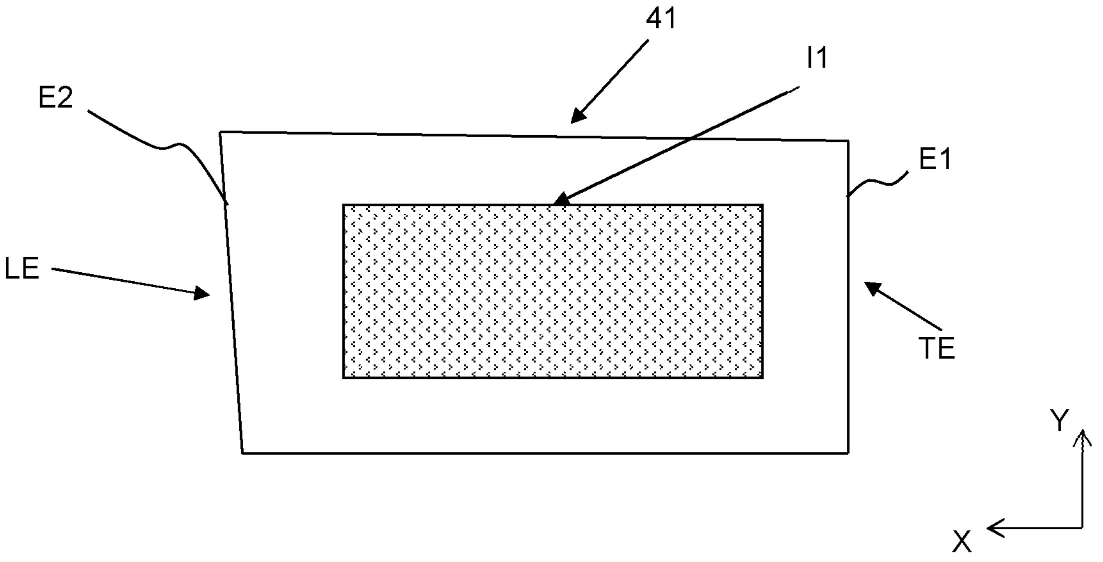
FIG. 5 is a schematic top view of the sheet in the step of printing the first image on the first side of the sheet aligned with the reference direction.

After passing the skew angle correction system 62, the sheet 41 arrives at the printhead assembly 31. The printhead assembly 31 preferably comprises a page-wide printhead array, which extends parallel to the reference direction Y. Since the skew angle correction system 62 rotated the first edge E1, being the trailing edge TE in FIG. 5, parallel to the reference direction Y, the first edge E1 extends parallel to the printhead array in this example. In consequence, the first image 11 is printed on the first side of the sheet 41 perpendicular to the first edge E1. It will be appreciated that the printhead array may also be at an angle with respect to the reference direction Y and/or the detection system, which can be corrected by the skew angle correction system 62 rotating the sheet 41 to compensate for any angular difference(s).

Figure 6:
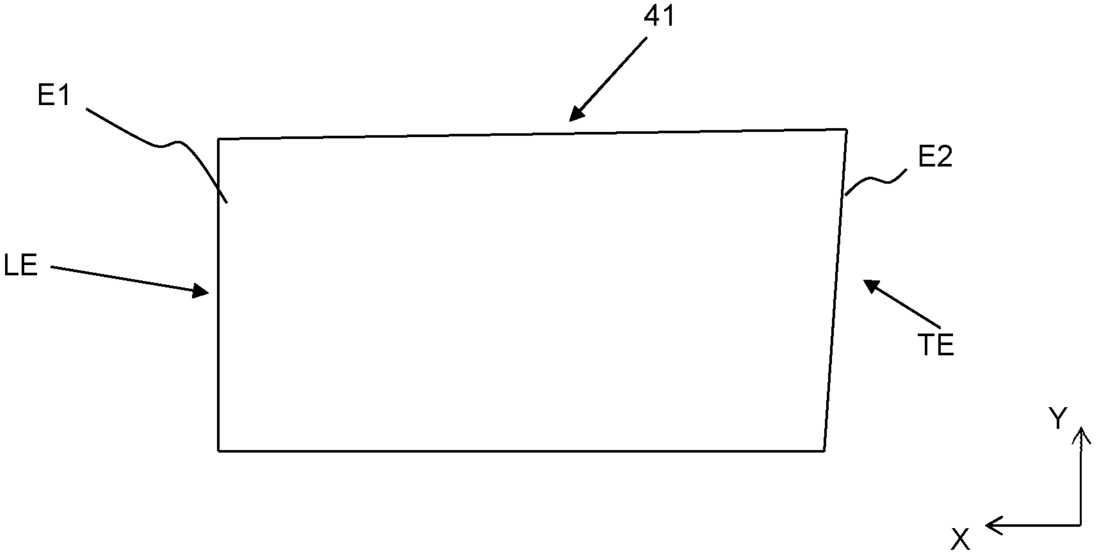
FIG. 6 is a schematic top view of the sheet in the step of flipping the one side-printed sheet.

In FIG. 6, the sheet 41 is flipped by a sheet flipping unit in the paper path section 35A. The flipping is performed around an axis extend in the reference direction Y, such that the first and second edges E1, E2 trade places. The first edge E1 becomes the leading LE and the second edge E2 the trailing TE. The second, unprinted side of the sheet 41 is positioned so that it will face the printhead assembly 31 on the second pass.

Figure 7:
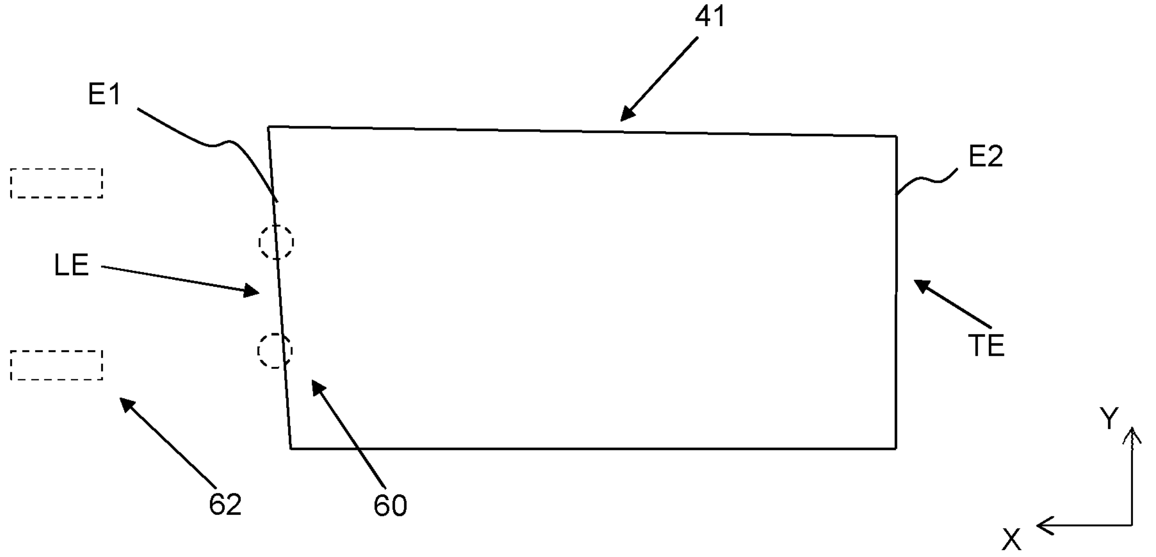
FIG. 7 is a schematic top view of the sheet in the step of detecting the angle of the leading edge of the flipped sheet in the second pass.

The flipped sheet 41 is returned to the skew angle correction system 61 via the paper path section 35, which is commonly referred to as the duplex path or loop. FIG. 7 illustrates the sheet 41 arriving at the skew angle correction system 62 on its second pass. There, the angle of the first edge E1, now positioned on the leading side of the sheet 41, is detected by the detection system 60. In case the angle of the sheet 41 is preserved perfectly on the paper path section 35 this detection is not required, but in practice the angle of the sheet 41 is altered during transport on the duplex loop.

Figure 8:
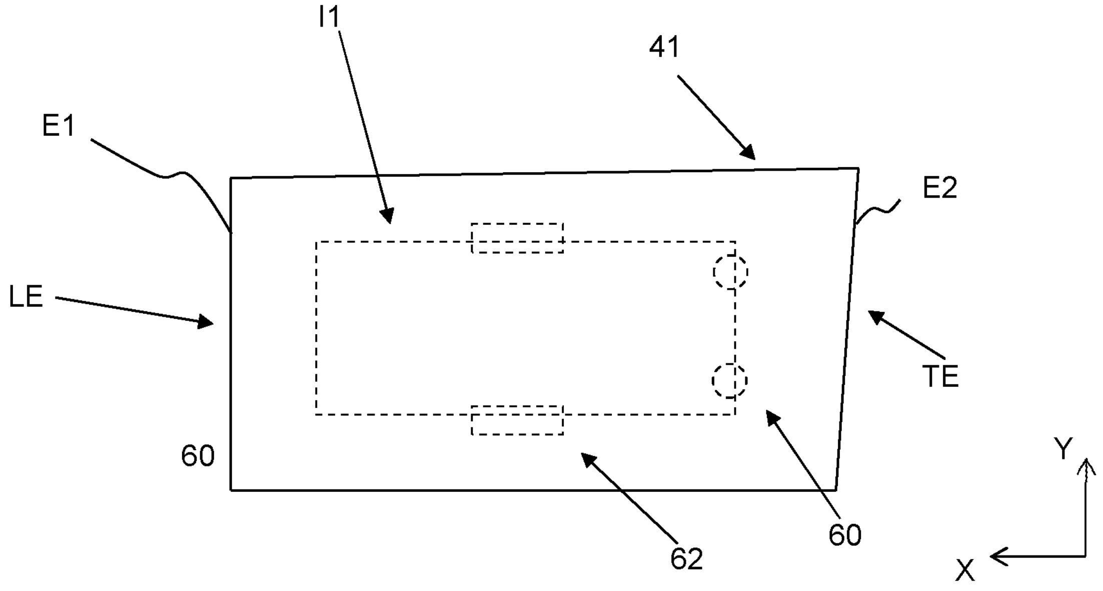
FIG. 8 is a schematic top view of the sheet in the step of rotating the sheet so that the first edge is aligned with the reference direction.

Based on the determined angle of the first edge E1 in FIG. 7, the sheet 41 is rotated by the skew angle correction system 62, as shown in FIG. 8. The first edge E1, being the leading edge LE on the second pass, is brought parallel to the reference direction Y. The sheet 41 is aligned in FIG. 8 with respect to the same first edge E1 as in FIG. 4. Thereby, the first image 11 which is now on the side of the sheet 41 facing away from the printhead assembly 31 is perpendicular to the reference direction Y.

Figure 9:
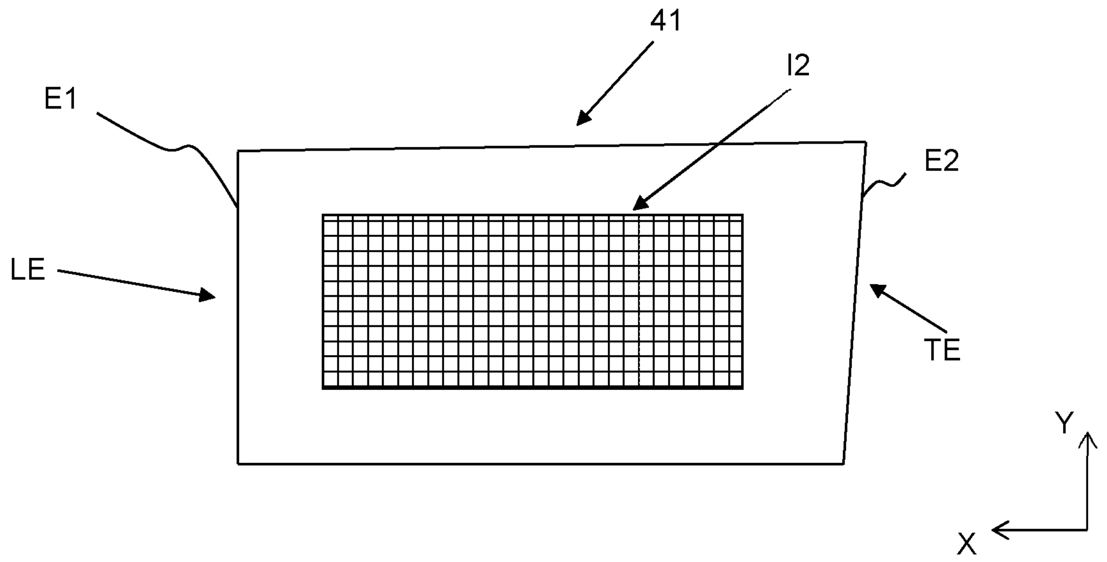
FIG. 9 is a schematic top view of the sheet in the step of printing the second image on the second side of the flipped sheet aligned with reference direction.

FIG. 9 illustrates the printing of the second image 12 on the second side of the sheet 41. The second image 12 printed in parallel alignment with the first image 11, since on both passes the sheet 41 has been aligned with respect to the printhead assembly 31 by the same first edge E1. The lateral positions of the images 11, 12 may be aligned by the sheet alignment mechanism 62 positioning the sheet 41 with respect to a lateral reference position and applying the lateral dimension of the images 11, 12 as well as their margins with respect to the lateral reference position. Similarly, the images 11, 12 may be aligned in the transport direction X by determining the margins between the respective leading and trailing edges of the sheet 41 and the images 11, 12.

Figure 10:
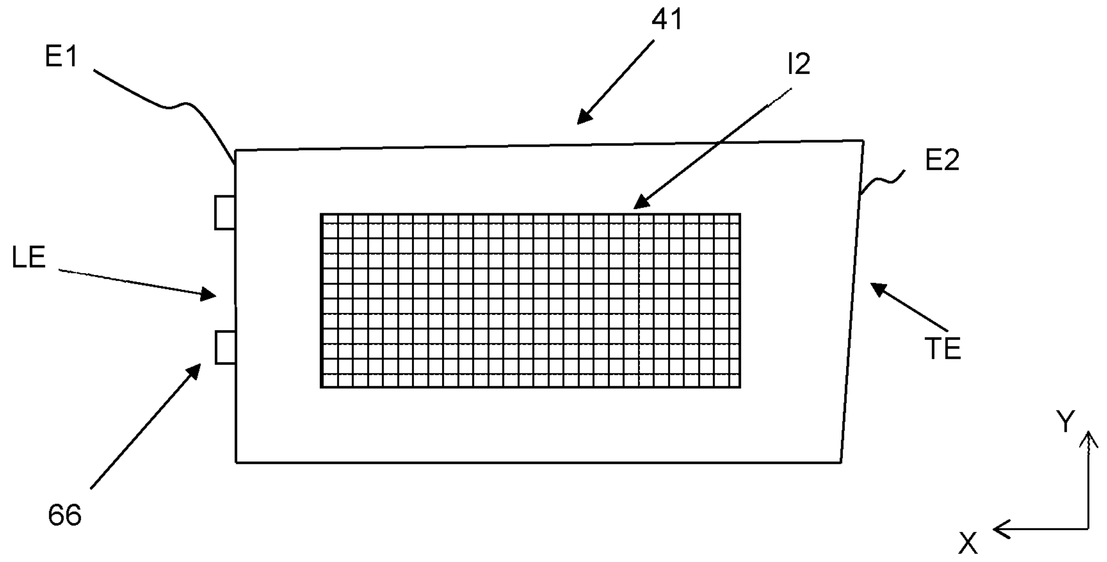
FIG. 10 is a schematic top view of the sheet in the step of registering the sheet by its first edge contacting a registration element of a sheet stacking device.

In FIG. 10, the double-sided printed sheet 41 arrives at the sheet stacking device. The sheet stacking device comprises a registration element 66 which defines a stacking reference direction, which in this example is parallel to the reference direction Y. The sheet 41 is driven against the registration element 66, so that the registration element 66 contacts the sheet at at least two spaced apart points. Thereby, the edge of the sheet 41 in contact with the registration element 66 is oriented parallel to the stacking reference direction Y. In FIG. 10, the leading edge LE contacts the registration element 66. Since the leading edge LE here is the same, first edge E1 with respect to the which the images 11, 12 were aligned all images 11, 12 for all sheets 41 in a stack are aligned parallel to the stacking reference direction Y. In plan-view all images 11, 12 on all the sheets 41 in a stack overlap, so that at least their leading edges are parallel to one another. In a further step, the stack is transported to a stack processing device, such a cutter, book binder, folder, etc. The side of the stack formed of the leading edges is used to align the stack in the stack processing device. Since all the images in the stack are aligned with respect to one another, these will also be aligned in the processed print product. For example, in case of a book all lines and/or images will be in parallel alignment.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of printing and stacking sheets comprising the steps of:

registering a sheet on a first pass of the sheet past a skew angle correction system;

moving the registered sheet on the first pass past a printhead assembly for printing a front image on a first side of the sheet;

detecting a skew angle between a first edge and a second edge of the sheet;

registering the sheet on a second pass of the sheet past the skew angle correction system;

moving the registered sheet on the second pass past the printhead assembly for printing a back image on a second side of the sheet, wherein in the first and second passes the respective front and back images have been aligned with respect to the first edge of the sheet by and applying the skew angle; and after the second pass, stacking the sheet, wherein the first edge of the sheet is registered to a registration element of a sheet stacking device having a predetermined stacking reference direction.

2. The method according to claim 1, further comprising the step of detecting a first angle of the first edge and a second angle of the second edge with respect to a reference direction.

3. The method according to claim 2, wherein the step of detecting the first and second angles is performed before the sheet arrives at the printhead assembly on the first pass.

4. The method according to claim 2, further comprising the step of flipping the sheet, such that the first and second edges each take the relative position of the other.

5. The method according to claim 4, wherein on the second pass the second image is aligned with respect to a leading edge of the sheet, the leading edge having been a trailing edge of the sheet on the first pass.

6. The method according to claim 5, wherein on the first pass the first image is aligned with respect to a trailing edge of the sheet.

7. The method according claim 6, wherein the sheet is registered during stacking to the leading edge after the second pass.

8. The method according to claim 7, wherein the first edge is opposite the second edge of the sheet.

9. A duplex printer comprising:

a print surface;

a printhead assembly facing the print surface;

a sheet conveying system arranged to feed sheets over the print surface and past the printhead assembly, the sheet conveying system including a duplex loop;

a skew angle correction system arranged to rotate the sheets relative to images to be printed thereon;

a detection system arranged to detect an edge of the sheet; and an electronic controller receiving signals from the detection system and controlling the printhead assembly, the sheet conveying system and the skew angle correction system, wherein the controller is configured to perform the method according to claim 1.

10. A computer program embodied on a non-transitory computer readable medium and comprising instructions to cause the printer according to claim 9 to execute the steps of the method.

11. The method according to claim 1, wherein the sheet stacking device further includes at least one output holder, and the registration element is positioned upstream of the at least one output holder such that the sheet is registered by the registration element in the sheet stacking device prior to arriving at the at least one output holder.

12. The method according to claim 11, wherein the first edge of the sheet is not parallel to the second edge of the sheet.

* * * * *